Feb. 23, 1954
G. BARSKY ET AL
2,670,355
MANUFACTURE OF MALEIC ANHYDRIDE
Filed Feb. 23, 1950
Fig. 1
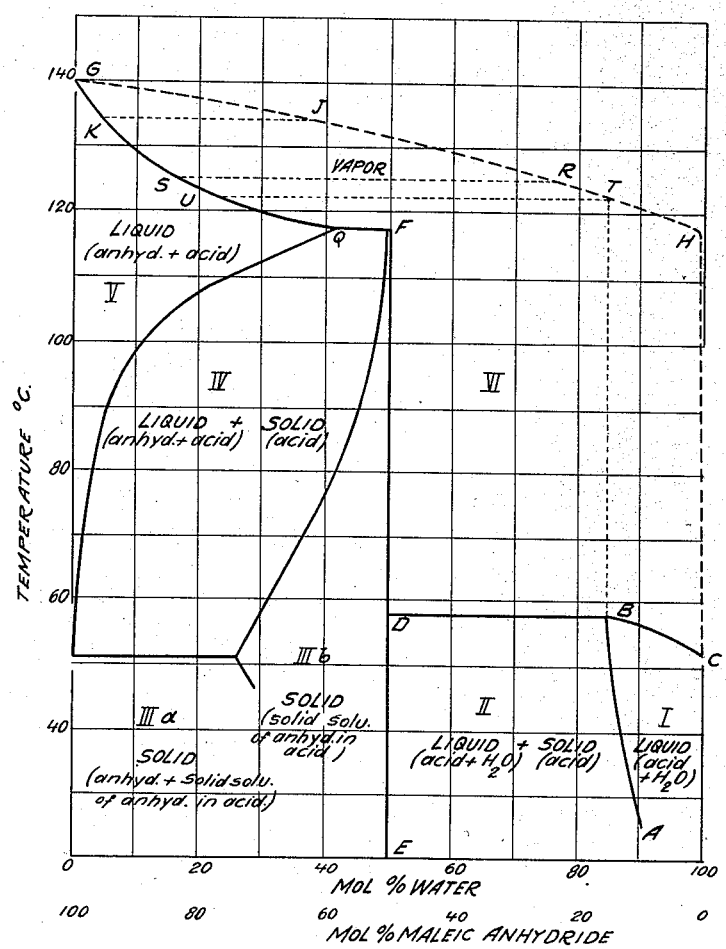
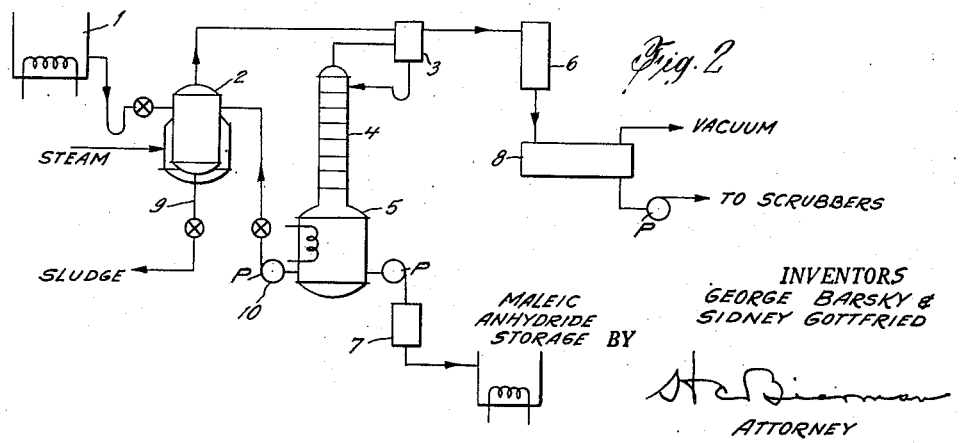
Fig. 2
INVENTORS
GEORGE BARSKY &
SIDNEY GOTTFRIED
BY
ATTORNEY Patented Feb. 23, 1954

2,670,355

UNITED STATES PATENT OFFICE 2,670,355

MANUFACTURE OF MALEIC ANHYDRIDE

George Barsky, New York, and Sidney Gottfried, Brooklyn, N. Y.; said Gottfried assignor to said Barsky Application February 23, 1950, Serial No. 145,674

15 Claims. (Cl. 260—346.8)

The present invention relates to the production of maleic anhydride from maleic acid. In particular it relates to the production of maleic anhydride from aqueous solutions of maleic acid by a continuous process.

In the production of maleic anhydride from maleic acid solutions, such as those obtained in the vapor phase catalytic oxidation of benzene, the methods used in the prior art have usually involved three independent steps:

1. The separation of maleic acid
2. Decomposition of the maleic acid to maleic anhydride
3. Redistillation of the maleic anhydride The handling of maleic acid solutions has been avoided as much as possible in previous processes because concentrated solutions are not very fluid at ordinary temperatures, tending to crystallize. The decomposition of maleic acid to maleic anhydride on the other hand cannot take place in the presence of the relatively large amounts of water present. According to prior art heating maleic acid solutions is objectionable because of the formation of fumaric acid.

Prior art prefers to start by separating maleic acid from solution in the form of a solid, for example by vacuum evaporation and crystallization and to decompose the maleic acid by heating to maleic anhydride and water.

The recovery of maleic anhydride from the vapors of decomposition of maleic acid has, in the past, been accomplished by fractional condensation. In the process described in U. S. Pat. 2,340,490 for example, solid maleic acid is vaporized completely and a fraction is condensed from the vapor. This fraction contains maleic anhydride together with maleic acid and must be redistilled. The process of fractional condensation involves the handling of mixtures containing varying proportions of maleic anhydride and water. At certain stages of such fractional condensation, solid maleic acid is formed by reaction of maleic anhydride and water. The maleic acid so formed tends to block mechanically any ordinary type of continuous apparatus. For this reason, it is not possible to concentrate and dehydrate maleic acid solutions to maleic anhydride in a continuous operation by the methods described in the prior art.

We have discovered that it is possible to obtain pure anhydrous maleic anhydride from solutions such as 65% maleic acid in water in a simple continuous process without the formation of solid maleic acid by means of the proper control of the temperature, pressure, and composition at critical points of the system in a suitable apparatus. By working in accordance with the principles of our discoveries, we have succeeded in producing maleic anhydride continuously from maleic acid solutions without the formation of substantial quantities of undesired by-products.

Our invention can best be understood by reference to the accompanying phase diagram, Figure I, which we have constructed after a careful study of the physical chemistry involved in all steps of the transformation of maleic acid solutions to maleic anhydride.

Figure I depicts the system maleic anhydride-water at 100 mm. pressure. The area I represents the condition where maleic acid is dissolved in water and the line AB represents the solubility curve. The point B is the boiling point, 58° C., of the saturated solution at that pressure. The line BC represents the boiling points of various intermediate solutions at 100 mm. pressure. The area II represents the conditions in which there are present liquid, maleic acid dissolved in water, and solid acid. The line BD represents various ratios of solid acid to solution. The line EF represents a composition of equimolecular parts of water and maleic anhydride, corresponding to solid maleic acid. Thus if we have a solution containing maleic acid and proceed to concentrate the solution, conditions will be represented by travelling along the line AB and then the line BD. At pressures higher than 100 mm. the line BD will be shorter and higher in the diagram because the temperature will be higher. Areas IIIa, IIIb, IV, V, and VI represent other compositions as indicated on the diagram. VI is the vapor phase. The line G J R H C is not a phase boundary but represents the composition of the vapor in equilibrium with the other phases. In phase rule terminology this is known as the vapor line. Thus point J gives the composition of the vapor in equilibrium with liquid of composition K, and the point R the composition of the vapor in equilibrium with liquid of the composition S. From this diagram the composition of all phases can be obtained for any conditions at 100 mm. pressure. Similar diagrams can be set up for the equilibria at other pressures.

In order to have a continuous process for recovering maleic anhydride from maleic acid solutions, we have found that it is necessary to avoid conditions in which liquid solid compositions as represented by areas II, IIIa, IIIb, and IV can exist and our process for recovering maleic anhydride is characterized by a choice of operating conditions such that the formation of systems corresponding to areas II, IIIa, IIIb, and IV of Figure I is avoided. In other words, when operating according to our invention, the formation of a solid phase at any point within the apparatus is prevented.

According to our invention, the formation of a solid phase is avoided by control of temperature and by the addition of maleic anhydride or maleic anhydride rich vapor at one or more points in the system. By this addition we shift conditions to points farther to the left in the diagram, Figure I. Maleic anhydride may be added in various ways and at various points. In one method of procedure we may add continuously to the vapor formed by decomposition of maleic acid a vapor composed of pure maleic anhydride or a mixture of maleic anhydride vapor and water vapor rich in anhydride. Another method is to supply continuously to the liquid condensate from the vapors formed by decomposition of maleic acid a mixture of maleic anhydride vapor and water vapor rich in anhydride, or pure maleic anhydride vapor. In another variation of the invention we may add the mixture of maleic anhydride and water or the pure anhydride in the liquid phase instead of to the vapor phase. Any of these methods or a combination of the methods may be used. The essential feature of this invention is to maintain the composition of the liquid such that no solid can precipitate at the temperature and pressure at which the operation takes place. The process is best adapted to use with solutions of maleic acid containing at least about five molecular percent of maleic acid. However, more dilute solutions can be processed after prior enrichment, for example through evaporative concentration or by addition of maleic acid or anhydride.

The accompanying drawing, Figure 2, shows diagrammatically one manner in which the above process may be carried out and the various steps involved. Maleic acid solution of approximately 65% is fed from storage tank 1 to a flash boiler 2 which may consist of a chamber, heated by any convenient means, into which the feed liquor is fed continuously. The rate of feed is adjusted so that the liquid is evaporated as rapidly as it is introduced, and no substantial volume of feed liquid accumulates in the boiler. The boiler may be at a somewhat higher pressure than the rest of the apparatus, and vapors passed through a pressure reducing device, or it may be at the same pressure. A small amount of liquid may be allowed to flow from the flash chamber to carry away non-volatile residues through line 9.

In one example of the practice of our invention, vapors from the flash boiler which are of a composition represented by point R, Fig. I, at a pressure of 100 mm. of mercury pass through the condenser or dephlegmator 3. There they mix with vapors coming from the top plate of column 4 and the two partially condense together. The temperature of the condensate is carefully controlled to be at least above that of point Q, Fig. I. Point Q is the triple point at which solid maleic acid, a liquid solution of maleic acid in maleic anhydride, and vapor coexist in equilibrium. If the temperature is too low, too large a portion of water will condense and run into the stripping column 4, giving a condensate having a composition falling within area IV, and allowing a solid to precipitate causing plugging of the column 4. Vapors uncondensed by dephlegmator 3 pass to a second condenser 6 which operates at a lower temperature than 3. Here the balance of the water and the maleic anhydride is condensed, yielding a solution of maleic acid in water. This solution is reprocessed. It is desirable that this condensate have a composition falling within the area I Figure 2. Too high a temperature of condensate at 3 will allow too large a proportion of maleic anhydride to pass on to the final condenser 6, and if the final condensate is more than saturated maleic acid will separate, giving mechanical trouble. To avoid this, the vapor passing the condenser 6 should preferably contain less maleic anhydride than the composition represented by point B in the phase diagram Figure I, which is the composition of a saturated solution of maleic acid in water at its boiling point. Such compositions fall to the left of line BT, and the liquid temperature corresponding to vapor temperature T is determined by line TU. Temperature T may be defined as the dew point temperature of a mixture of water vapor and maleic anhydride vapor having a composition corresponding to that of a saturated solution of maleic acid in water at its boiling point. Therefore dephlegmator 3 should be maintained to yield a condensate above the temperature of Q and preferably below the temperature of U. At a pressure of 100 mm. this corresponds to a dephlegmator condensate temperature above 117° C. and below 122° C. However, if the dephlegmator condensate temperature is allowed to rise above temperature U and maleic acid separates in condenser 6, it may be redissolved by introducing a stream of diluting water into condenser 6 without interrupting the continuity of the process.

The liquid condensate in condenser 3 is delivered to the top of a stripping column system 4 which consists of several bubble cap plates, preferably made of stainless steel. The composition of the liquid feed to the top plate of this column is controlled by controlling the temperature of the condensate from condenser 3 and the rate of reboiling in 5. The actual composition of the liquid on the top plate is fixed by fixing the temperature at the top of column 4 and is controlled by the rate of reboiling in reboiler 5. Control of the temperature at the top of the stripping column is very important. It should be at least above Q in Figure I. If the temperature is too low, crystalline solid will appear and block the flow of liquid in the column. By operating at 130° C. at an absolute pressure of 100 mm. of Hg we have found it possible to keep this column clear. The composition of the liquid at the top of this column is approximately 10% total water and 90% maleic anhydride under those conditions. As the liquid descends through the column 4 the water present is stripped out so that on reaching the reboiler 5 the liquid consists of substantially pure maleic anhydride. This is insured by maintaining the temperature in the reboiler at approximately 140° C., the temperature of saturated maleic anhydride vapor at the pressure at which operations were conducted. The accumulating maleic anhydride in the reboiler is drawn off through a cooler 7 and represents the final product of the operation. The maleic anhydride may be filtered at its melting point or slightly above to remove small quantities of fumaric acid or maleic acid which may be present but which are not appreciably soluble in maleic anhydride at this temperature. It may be cooled and flaked on a wheel if such is the form desired. Vapors leaving condenser 3 are condensed by condenser 6 and run to receiver 8. This condensate, a dilute solution of maleic acid, is well adapted for use in scrubbing gases from an oxidation unit in which maleic acid is synthesized, as its freedom from impurities helps to avoid fumaric acid formation. Such solutions of maleic acid in water should be maintained below 70° C. at all times. We have discovered that the rate of formation of fumaric acid even in saturated aqueous solutions of maleic acid, is negligible within reasonable time limits providing the temperature of such solutions is kept below 70° C.

In a variation of the procedure described above, a portion of the maleic anhydride accumulating in reboiler 5 is returned by means of a pump 10 to the flash boiler 2 where it mixes with the incoming maleic acid solution. This is advantageous since it increases the volume of high boiling liquid within the flash boiler, and serves as a heat exchange medium, facilitating the rapid evaporation of the incoming maleic acid solution. Recycling maleic anhydride also serves to enrich with respect to maleic anhydride the vapor leaving the reboiler. This is especially desirable when dilute maleic acid solutions are processed, because if the vapor reaching the dephlegmator 3 is too low in maleic anhydride, it may be difficult to control the dephlegmator and to maintain the dephlegmator condensate above the triple point temperature.

In operating the apparatus, a suitable vacuum system, pumps, equalizer lines, etc. are provided, as is customary in the technique of distilling under reduced pressures. Automatic controls may also be used. While we have described the operation at 100 mm. pressure, it is possible to operate at other pressures with corresponding changes in temperatures. In general, the higher the pressure, the greater the capacity of the apparatus. On the other hand, the higher the pressure, the greater the tendency toward the formation of fumaric acid in the liquid phase if maleic acid is present. In general it is desirable to operate at pressures below atmospheric.

The temperature of triple point Q and of the point on the vapor line corresponding to T will increase or decrease as the pressure is increased or decreased. Consequently the temperature range in which the dephlegmator condensate must be maintained will vary correspondingly. However at any given pressure these temperature limits can be determined from a consideration of the equilibrium data, as exemplified by the phase diagram at that pressure, as we have taught hereinbefore.

The apparatus and processes described herein are intended merely as examples of our invention, which is not limited to the described embodiments. It is to be understood that variations and modifications in the apparatus and the working thereof may be made without departing from the scope of our invention, which is limited only by the appended claims.

What we claim is:

1. The method of recovering maleic anhydride from a mixture of maleic anhydride vapor and water vapor containing at least about five molecular percent of maleic anhydride, the composition of said mixture being such that it would condense at a temperature not above the triple point, which consists in adding thereto maleic anhydride in sufficient amount to provide a mixture which would condense at a temperature above the triple point, fractionally condensing at a pressure not in excess of atmospheric said mixture of vapors at a temperature above that of the triple point at which a vapor phase comprising maleic anhydride and water, a liquid phase comprising maleic anhydride and maleic acid, and a solid phase comprising maleic anhydride and maleic acid can co-exist in equilibrium at the pressure at which condensation occurs, and thereafter fractionally distilling the condensate and separating the maleic anhydride as the high boiling fraction.

2. The method of recovering maleic anhydride from a mixture of maleic anhydride vapor and water vapor containing at least about five molecular percent of maleic anhydride, the composition of said mixture being such that it would condense at a temperature not above the triple point, which consists in adding thereto maleic anhydride in sufficient amount to provide a mixture which would condense at a temperature above the triple point, fractionally condensing at a pressure not in excess of atmospheric said mixture of vapors at a temperature above that of the triple point at which a vapor phase comprising maleic anhydride and water, a liquid phase comprising maleic anhydride and maleic acid, and a solid phase comprising maleic anhydride and maleic acid can co-exist in equilibrium at the pressure at which condensation occurs, and thereafter fractionally distilling the condensate by passing it to the top of a column still in which ebullition is maintained by a source of heat at the still bottom, simultaneously feeding the mixed vapor of water and maleic anhydride from the top of the still into the vapor stream entering the condenser and withdrawing substantially pure maleic anhydride from the bottom of the still.

3. The method of recovering maleic anhydride continuously from a solution of maleic acid in water containing at least about five molecular percent of maleic acid, the composition of said mixture being such that it would condense at a temperature not above the triple point, which consists in adding thereto maleic anhydride in sufficient amount to provide a mixture which would condense at a temperature above the triple point, rapidly and completely volatilizing said solution by feeding it continuously to a heated boiler at a pressure below atmospheric, passing the resultant vapors to a condenser in which fractional condensation is effected at a temperature above that of the triple point at which a vapor phase comprising maleic anhydride and water, a liquid phase comprising maleic anhydride and maleic acid, and a solid phase comprising maleic anhydride and maleic acid can co-exist in equilibrium at the pressure at which condensation occurs, and thereafter continuously fractionally distilling the condensate, separating substantially pure maleic anhydride as the high boiling fraction and returning the low boiling fraction as vapor to the body of vapor entering the condenser.

4. The method of recovering maleic anhydride continuously from a solution of maleic acid in water containing at least about five molecular percent of maleic anhydride, the composition of said mixture being such that it would condense at a temperature not above the triple point, which consists in adding thereto maleic anhydride in sufficient amount to provide a mixture which would condense at a temperature above the triple point, rapidly and completely volatilizing said solution by feeding it continuously to a heated boiler maintained at a pressure below atmospheric and containing a mass of liquid maleic anhydride in ebullition and maintained at constant volume by the continuous addition of liquid maleic anhydride, passing the resultant vapors to a condenser in which fractional condensation is effected at a temperature above the triple point at which a vapor phase comprising maleic anhydride and water, a liquid phase comprising maleic anhydride and maleic acid, and a solid phase comprising maleic anhydride and maleic acid can co-exist in equilibrium at the pressure at which condensation occurs, thereafter fractionally distilling the condensate by passing it to the top of a column still in which ebullition is maintained by a source of heat at the still bottom, simultaneously feeding the mixed vapor of water and maleic anhydride from the top of the still into the vapor stream entering the condenser, and withdrawing substantially pure maleic anhydride from the bottom of the still.

5. The method of recovering maleic anhydride continuously from a solution of maleic acid in water containing at least about five molecular percent of maleic acid, the composition of said mixture being such that it would condense at a temperature not above the triple point, which consists in adding thereto maleic anhydride in sufficient amount to provide a mixture which would condense at a temperature above the triple point, rapidly and continuously volatilizing said solution by feeding it continuously to a heated boiler maintained at a pressure below atmospheric and containing a mass of liquid maleic anhydride in ebullition maintained at constant volume by the continuous addition of liquid maleic anhydride, passing the resultant vapors to a condenser in which fractional condensation is effected at a temperature above the triple point at which a vapor phase comprising maleic anhydride and water, a liquid phase comprising maleic anhydride and maleic acid, and a solid phase comprising maleic anhydride and maleic acid can co-exist in equilibrium at the pressure at which condensation occurs, passing the uncondensed vapors from the said condenser to a second condenser in which said vapors are fully condensed to yield a dilute solution of maleic acid in water, fractionally distilling the condensate from the first condenser by passing it to the top of a column still in which ebullition is maintained by a source of heat at the still bottom, simultaneously feeding the mixed vapor of water and maleic anhydride from the top of the still into the vapor stream entering the first condenser and withdrawing substantially pure maleic anhydride from the bottom of the still.

6. The method of recovering maleic anhydride from a mixture of maleic anhydride vapor and water vapor which consists in fractionally condensing, at a pressure below atmospheric, said mixture of vapors, adding to the condensate at the moment of condensation sufficient liquid maleic anhydride to yield a mixture free from solid phase at the temperature of condensation, and thereafter fractionally distilling said condensate and separating the maleic anhydride as the low boiling fraction.

7. The method of recovering maleic anhydride from a mixture of maleic anhydride vapor and water vapor described in claim 1 in which the maximum temperature of fractional condensation is below the dew point temperature of a mixture of water vapor and maleic anhydride vapor having a composition corresponding to that of a saturated aqueous solution of maleic acid at its boiling point at the pressure existing at the point of said fractional condensation.

8. The method of recovering maleic anhydride from a mixture of maleic anhydride vapor and water vapor described in claim 2 in which the maximum temperature of fractional condensation is below the dew point temperature of water vapor and maleic anhydride vapor having a composition corresponding to that of a saturated aqueous solution of maleic acid at its boiling point at the pressure existing at the point of said fractional condensation.

9. The method of recovering maleic anhydride continuously from a solution of maleic acid in water described in claim 3 in which the maximum temperature of fractional condensation is below the dew point temperature of a mixture of water vapor and maleic anhydride vapor having a composition corresponding to that of a saturated aqueous solution of maleic acid at its boiling point at the pressure existing at the point of said fractional condensation.

10. The method of recovering maleic anhydride continuously from a solution of maleic acid in water described in claim 4 in which the maximum temperature of fractional condensation is below the dew point temperature of a mixture of water vapor and maleic anhydride vapor having a composition corresponding to that of a saturated aqueous solution of maleic acid at its boiling point at the pressure existing at the point of said fractional condensation.

11. The method of recovering maleic anhydride continuously from a solution of maleic acid in water described in claim 5 in which the maximum temperature of fractional condensation is below the dew point temperature of a mixture of water vapor and maleic anhydride vapor having a composition corresponding to that of a saturated aqueous solution of maleic acid at its boiling point at the pressure existing at the point of said fractional condensation.

12. The method of recovering maleic anhydride from a mixture of maleic anhydride and water vapor, the composition of said mixture being such that it would condense to solid plus liquid, which consists in adding thereto maleic anhydride in sufficient amount to provide a mixture which would condense to liquid without solid, fractionally condensing at a pressure below atmospheric said mixture of vapors, and thereafter fractionally distilling said condensate and separating the maleic anhydride.

13. The method of recovering maleic anhydride from a mixture of maleic anhydride vapor and water vapor, the composition of said mixture being such that it would condense to solid plus liquid, which consists in adding thereto maleic anhydride in sufficient amount to provide a mixture which would condense to liquid without solid, fractionally condensing said mixture of vapors at a temperature above that of the triple point at which a vapor phase comprising maleic anhydride and water, a liquid phase comprising maleic anhydride and maleic acid, and a solid phase comprising maleic anhydride and maleic acid can co-exist in equilibrium at the pressure at which condensation occurs, and thereafter fractionally distilling the condensate and separating the maleic anhydride.

14. A method according to claim 12 in which the added maleic anhydride is in the form of vapor.

15. A method according to claim 12 in which the added maleic anhydride is in the form of liquid.

GEORGE BARSKY.
SIDNEY GOTTFRIED.

References Cited in the file of this patent

UNITED STATES PATENTS

| Number | Name | Date |
|---|---|---|
| 2,205,402 | Foster | June 25, 1940 |
| 2,222,283 | Crowell | Nov. 19, 1940 |
| 2,340,490 | Porter | Feb. 1, 1944 |
| 2,462,444 | Weiss | Feb. 22, 1949 |

FOREIGN PATENTS

| Number | Country | Date |
|---|---|---|
| 508,489 | Great Britain | June 30, 1939 |

OTHER REFERENCES

Eastman and Rollefson, "Physical Chemistry," published by McGraw Hill Book Co., New York, N. Y., pp. 315–332.

Robinson and Gillilord "Elements of Fractional Distillation," 3rd. ed., publ. 1939 by McGraw Hill Book Co., pp. 9–13, 17.